United States Patent
Kim

(10) Patent No.: US 11,130,527 B2
(45) Date of Patent: Sep. 28, 2021

(54) VEHICLE BODY

(71) Applicants: Hyundai Motor Company, Seoul (KR); Kia Motors Corporation, Seoul (KR)

(72) Inventor: Ho Yeon Kim, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 98 days.

(21) Appl. No.: 16/545,598

(22) Filed: Aug. 20, 2019

(65) Prior Publication Data

US 2020/0324824 A1   Oct. 15, 2020

(30) Foreign Application Priority Data

Apr. 11, 2019   (KR) .................. 10-2019-0042695

(51) Int. Cl.
  *B62D 25/04*    (2006.01)
  *B62D 25/02*    (2006.01)
  *B62D 21/15*    (2006.01)
  *B62D 25/14*    (2006.01)

(52) U.S. Cl.
  CPC ......... *B62D 25/04* (2013.01); *B62D 25/025* (2013.01); *B62D 25/145* (2013.01); *B62D 21/152* (2013.01)

(58) Field of Classification Search
  CPC ........ B62D 25/04; B62D 25/02; B62D 23/00; B62D 31/03
  USPC ............. 296/187.03, 203.1, 193.05, 193.06, 296/187.12, 203.03
  See application file for complete search history.

(56) References Cited

U.S. PATENT DOCUMENTS

| | | | |
|---|---|---|---|
| 7,213,874 B2 * | 5/2007 | Osterberg | B62D 25/02 296/203.03 |
| 2003/0042763 A1 * | 3/2003 | Yamada | F16F 7/121 296/205 |
| 2005/0189790 A1 * | 9/2005 | Chernoff | B62D 25/04 296/193.05 |

FOREIGN PATENT DOCUMENTS

| | | | | |
|---|---|---|---|---|
| CN | 209870531 U | * | 12/2019 | |
| JP | 4464383 B2 | * | 5/2010 | ............. B62D 33/06 |
| JP | 5460402 B2 | * | 4/2014 | |
| JP | 2015134574 A | * | 7/2015 | |
| KR | 101795403 B1 | | 11/2017 | |

* cited by examiner

*Primary Examiner* — Jason S Morrow
*Assistant Examiner* — Kevin P Weldon
(74) *Attorney, Agent, or Firm* — Mintz Levin Cohn Ferris Glovsky and Popeo, P.C.; Peter F. Corless

(57) ABSTRACT

A vehicle body includes a plurality of lateral units and a cross unit having a plurality of cross members for connecting the lateral units, where neighboring cross members form a closed structure together with members of the lateral units disposed at opposite sides. The vehicle body entirely surrounds the closed structure.

14 Claims, 3 Drawing Sheets

VEHICLE BODY

CROSS REFERENCE TO RELATED APPLICATION

The present application claims priority to Korean Patent Application No. 10-2019-0042695, filed on Apr. 11, 2019, the entire contents of which is incorporated herein for all purposes by this reference.

BACKGROUND

1. Technical Field

The present disclosure relates to a vehicle body, and more particularly, to a vehicle body that is to be applied to a subcompact micro mobility or the like to ensure the torsional rigidity and collision rigidity of a vehicle.

2. Description of the Related Art

The high demand for subcompact electric vehicles is predicted in the future. Thus, there is a need to develop a new vehicle body using a press welding method of the vehicle body in consideration of mass production, but not conventional manual production. However, most compact vehicles are configured in a typical two-row seat type and configured with doors that are opened and closed in a width direction of the vehicle.

A micro mobility vehicle is configured in a one-row seat type to cause disconnection of a reinforced frame. Due to such a connection structure, it is difficult to ensure sufficient loop stiffness and it is also difficult to ensure high rigidity of a vehicle body. The micro mobility is designed with a short front overhang and thus has a problem in that a front shock absorption space of a vehicle is small and it is difficult to maintain an indoor space. Accordingly, a vehicle body structure as new micro mobility and personal mobility needs a structure that ensures torsional rigidity and collision rigidity.

The contents described as the related art have been provided merely to assist in understanding the background of the present disclosure and should not be considered as corresponding to the related art known to those having ordinary skill in the art.

SUMMARY

An object of the present disclosure is to provide a vehicle body that is also applied to subcompact micro mobility or the like to ensure the torsional rigidity and collision rigidity of a vehicle.

According to an exemplary embodiment of the present disclosure, a vehicle body may include a lateral unit formed a polygonal shape by connecting a front pillar member, a roof side member, a quarter pillar member, and a doorsill member, configures a structure of a lateral surface of the vehicle body, and simultaneously forms a door opening, and a cross unit that includes a plurality of cross members that extend in a width direction of a vehicle, connects the lateral units disposed at opposite sides in the width direction of the vehicle, and is used for connection of each of a foremost end, a rearmost end, an uppermost end, and a lowermost end of the lateral unit. Additionally, neighboring cross members form a closed ring-shaped structure together with members of the lateral units disposed at opposite sides, and the vehicle body entirely surrounds the ring-shaped structure.

The lateral unit may form a hexagonal structure. The cross unit may connect vertex parts of the hexagonal shape of the lateral unit to each other. The front pillar member may include a front upper member and a front lower member, a connection point between the front upper member and the front lower member forms a foremost end portion of the lateral unit, and the foremost end portion of the lateral unit may be connected to a foremost cross member of the cross unit. A lower end of a front wind shield glass may be installed on a foremost cross member, and the foremost cross member may be disposed in front of a front wheel suspension mounting portion of the vehicle.

A connection point between the front pillar member and the doorsill member may be connected to a front cross member of a lowermost end of the cross unit. A central portion of the doorsill member may be connected to a center cross member of a lowermost end of the cross unit. A connection point between the front pillar member and the roof side member may be connected to a front cross member of an uppermost end of the cross unit. A connection point between the roof side member and the quarter pillar member may be connected to a rear cross member of an uppermost end of the cross unit.

Additionally, the quarter pillar member may include a quarter pillar upper member that extends to be inclined backward and downward from an upper end, and a quarter pillar lower member that extends forward and downward from the upper end. An upper end of the quarter pillar upper member may be connected to the roof side member and a lower end of the quarter pillar lower member may be connected to the doorsill member. A connection point between a quarter pillar upper member and a quarter pillar lower member may be connected to a rearmost cross member of the cross unit. The cross member of the cross unit may have an end with a polygonal section and may be connected to the lateral unit through the polygonal section.

The lateral unit may include a polygonal reinforced frame, an inner frame coupled to a side of the reinforced frame, which corresponds to an internal side of the vehicle, and an outer frame coupled to a side of the reinforced frame, which corresponds to an external side of the vehicle. The inner frame may be coupled to parts that correspond to a roof side and a quarter pillar of the reinforced frame to form a structure of a closed section with the reinforced frame. The outer frame may extend along an entire layout of the reinforced frame and may be coupled to the reinforced frame to form a structure of a closed section with the reinforced frame. In addition, members of the lateral unit, which correspond to the roof side, and the quarter pillar with which the inner frame, the reinforced frame, and the outer frame overlap together may form a structure with a double closed section.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
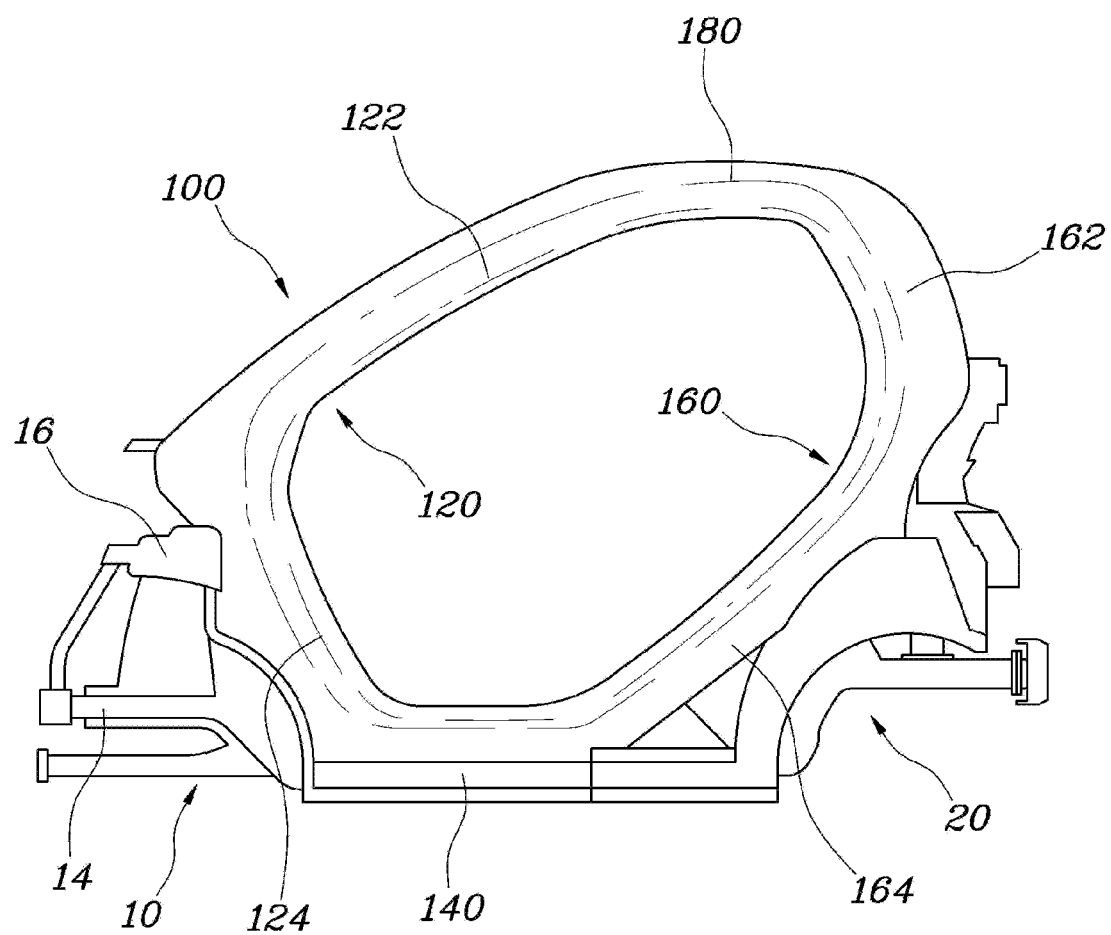
FIG. 1 is a diagram showing a lateral unit of a vehicle body according to an exemplary embodiment of the present disclosure.
Figure 2:
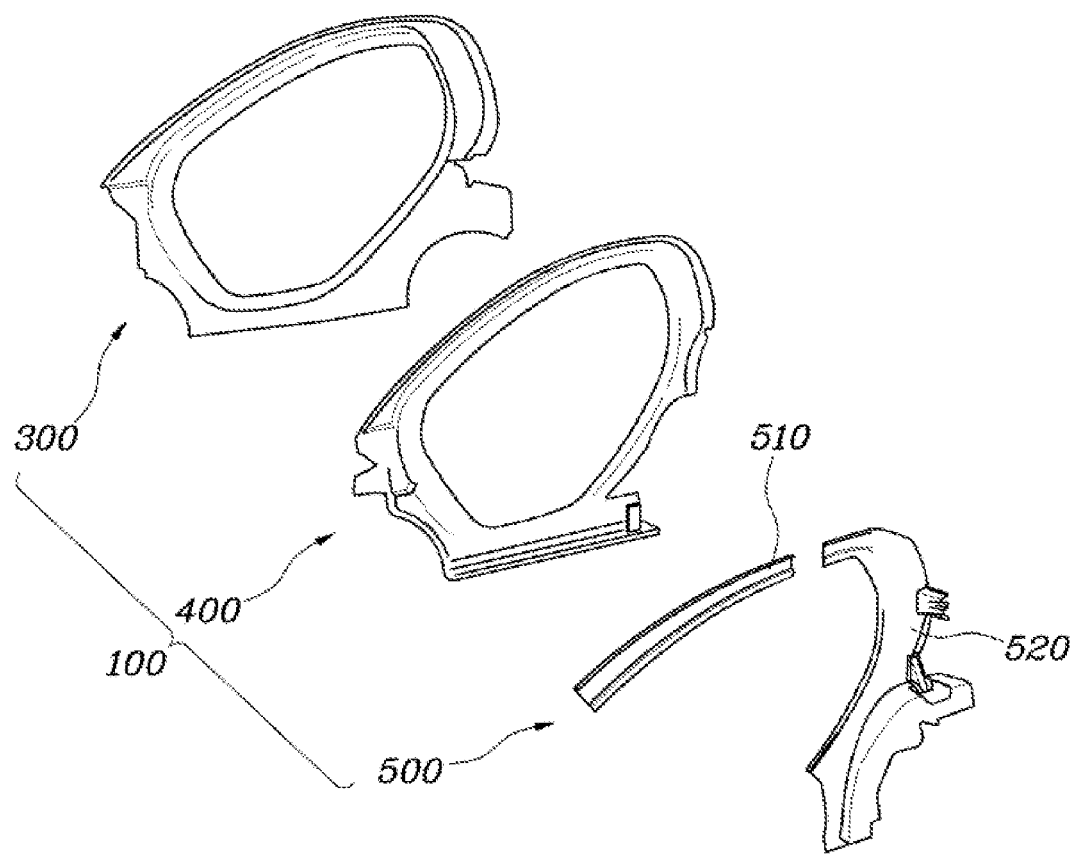
FIG. 2 is a detailed perspective view of a lateral unit of a vehicle body according to an exemplary embodiment of the present disclosure.
Figure 3:
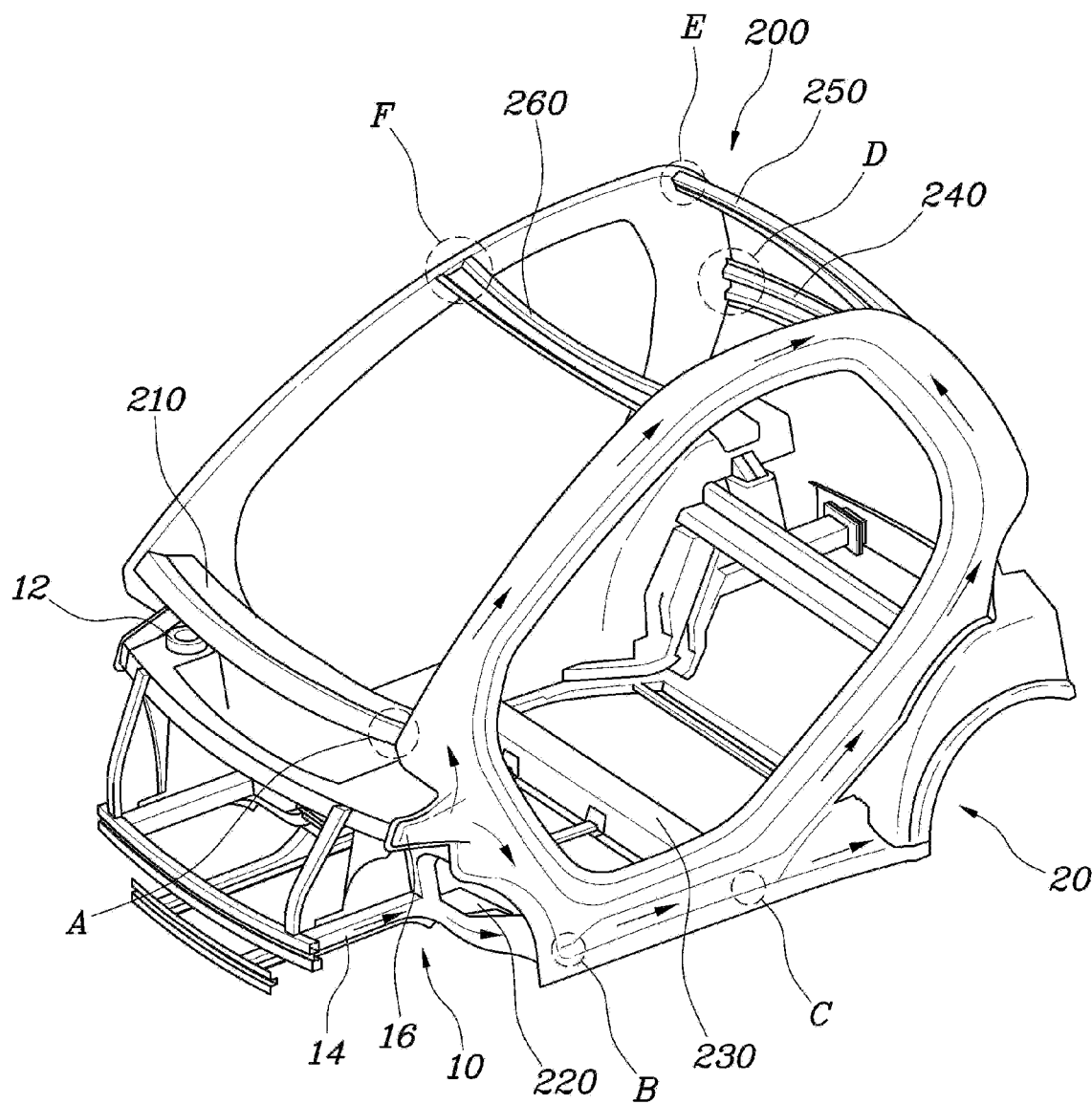
FIG. 3 is a perspective view of a vehicle body according to an exemplary embodiment of the present disclosure.

FIG. 1 is a diagram showing a lateral unit of a vehicle body according to an exemplary embodiment of the present disclosure. FIG. 2 is a detailed perspective view of a lateral unit of a vehicle body according to an exemplary embodiment of the present disclosure. FIG. 3 is a perspective view of a vehicle body according to an exemplary embodiment of the present disclosure.

FIG. 1 is a diagram showing a lateral unit of a vehicle body according to an exemplary embodiment of the present disclosure. The vehicle body according to the present disclosure may include a lateral unit 100 formed in a polygonal shape by connecting a front pillar member 120, a roof side member 180, a quarter pillar member 160, and a doorsill member 140, configures a structure of a lateral surface of the vehicle body, and simultaneously forms a door opening, and a cross unit 200 having a plurality of cross members that extend in a width direction of the vehicle. The cross unit 200 may connect the lateral units 100 disposed at opposite sides in the width direction of the vehicle, and may be used for connection of each of a foremost end, a rearmost end, an uppermost end, and a lowermost end of the lateral unit 100. In addition, neighboring cross members may form a closed ring-shaped structure together with members of the lateral units disposed at opposite sides, and thus the vehicle body entirely surrounds the ring-shaped structure.

The vehicle body according to the present disclosure may be applied to various vehicles, particularly to a subcompact vehicle, that is, micro mobility and personal mobility that are driven by a motor or the like and have a vehicle body structure with a two-seater environment, and in this case, an effect achieved from the vehicle body may be enhanced. A subcompact vehicle needs to have a frame connection structure for mass production, but a conventional vehicle body has no frame structure that corresponds to such a subcompact vehicle, and thus requires a new design. In addition, the subcompact vehicle has a very small front space of a vehicular cabin due to obviation of an engine, and accordingly collision rigidity is insufficient during front collision.

To achieve a lightweight structure, a structure such as a subframe needs to be obviated, and thus the torsional rigidity of a vehicle is also inevitably insufficient. In particular, in a conventional vehicle frame structure, a rear side of a C pillar, that is, a quarter pillar part is disconnected from a front part of the vehicle body, and thus when this structure is applied directly to a subcompact vehicle, torsional rigidity is decreased.

To overcome this problem, according to the present disclosure, first, in a lateral structure of a vehicle body, a structure for forming a door frame may be configured in a polygonal structure with a closed ring shape and members may be connected in a band shape to enhance torsional rigidity and to form a ring-shaped load path. Such lateral units may be disposed at opposite sides and the lateral units at the opposite sides may be connected to each other in a width direction using a plurality of cross members, and in this regard a plurality of cross members may be disposed at respective appropriate positions, and thus a vehicle may have an overall polygonal pillar shape and may have a similar structure to a honeycomb structure.

According to the present disclosure, by virtue of this structure, both collision rigidity and torsional rigidity may be improved and an ultra-light and subcompact vehicle body may be realized. In particular, the vehicle body according to the present disclosure may include the lateral unit 100 and the cross unit 200. The lateral unit 100 may be a polygonal connected ring-shaped structure formed by connecting the front pillar member 120, the roof side member 180, the quarter pillar member 160, and the doorsill member 140. The lateral unit may configure a lateral structure of the vehicle body and simultaneously may form an opening of a door, and accordingly a door frame may configure the lateral structure of the vehicle body. As shown in FIG. 3, a lower member 124 of the front pillar member 120 may configure a front wheel house 10 and a quarter pillar lower member 164 may form a rear wheel house 20.

The cross unit 200 may include a plurality of cross members that extend in a width direction of the vehicle. The cross members may connect the lateral units 100, positioned at opposite sides, in the width direction of the vehicle. Additionally, the cross members may connect the foremost end, the rearmost end, the uppermost end, and the lowermost end of the lateral unit 100, and thus may form a load path spread to the opposite sides of the vehicle to form the load path and to enhance torsional rigidity during lateral collision. According to the present disclosure, by virtue of this structure, neighboring cross members may form a closed ring-shaped structure together with members of the lateral unit 100 disposed at opposite sides, and thus the vehicle body entirely surrounds the ring-shaped structure.

In other words, the lateral unit 100 may form a closed polygonal shape, and simultaneously neighboring cross members may form a square shape together with the members of the lateral units disposed at the opposite sides. Accordingly, thus the lateral units may have a three-dimensional shape that are continuously surrounded by squares, and in the end the vehicle body may have a polygonal pillar shape. The polygonal pillar shape may have at least three load path branch points at any vertex, and thus is effective in shock absorption and dispersion, and all members of the polygonal pillar shape may be connected to each other to enhance the overall torsional rigidity of the vehicle.

Particularly, as shown in FIG. 1, the lateral unit 100 may be configured in a hexagonal structure. The lateral unit formed in a hexagonal shape indicates that the lateral unit has a closed ring-shape shape to have an approximate hexagonal shape. In addition, as shown in FIG. 3, the cross unit 200 may connect parts A, B, C, D, E, and F corresponding to vertexes of the hexagonal shape of the lateral unit 100. In particular, the lateral unit 100 may be divided into a plurality of member parts that are connected to each other. The front pillar member 120 may include a front upper member 122 and the front lower member 124, a connection point A between the front upper member 122 and the front lower member 124 may configure a foremost end portion of the lateral unit 100, and the foremost end portion of the lateral unit 100 may be connected to a foremost cross member 210 of the cross unit 200.

A lower end of a front wind shield glass may be installed on the foremost cross member 210, and as shown in FIG. 3 the foremost cross member 210 may be disposed in front of a front wheel suspension mounting portion 16 of the vehicle. In other words, the vehicle body according to the present disclosure may have an extremely short front overhang and may be completely designed as a subcompact vehicle to obviate a cowl frame. Accordingly, a front shock absorption space is minimally present in this structure, and thus shock may be sufficiently dispersed during a front collision, and simultaneously the rigidity of a passenger seat needs to be enhanced.

Additionally, the rigidity of a passenger seat requires enhancement. Accordingly, the connection point A between the front upper member 122 and the front lower member 124 may configure the foremost end portion of the lateral unit 100, and the foremost end portion of the lateral unit 100 may be connected to a foremost cross member 210 of the cross unit 200 to form a load path branched into three pieces. Further, shock input to the front wheel suspension mounting portion 16 adjacent to the foremost end portion of the lateral unit 100 may be dispersed to the front upper member 122 and the front lower member 124 through the load path to effectively disperse shock and to prevent a cabin from being deformed during a collision. A connection point B between the front pillar member 120 and the doorsill member 140 may be connected to a front cross member 220 of the lowermost end of the cross unit. In addition, a central portion C of the doorsill member 140 may be connected to a center cross member 230 of the lowermost end of the cross unit. A connection point F between the front pillar member 120 and the roof side member 180 may be connected to a front cross member 260 of the uppermost end of the cross unit. A connection point E between the roof side member 180 and the quarter pillar member 160 may be connected to a rear cross member 250 of the uppermost end of the cross unit.

Particularly, the quarter pillar member 160 may include a quarter pillar upper member 162 that extends to be inclined backward and downward from an upper end, and a quarter pillar lower member 164 that extends forward and downward from the upper end, and an upper end of the quarter pillar upper member 162 may be connected to the roof side member 180 and a lower end of the quarter pillar lower member 164 may be connected to the doorsill member 140. A connection point D between the quarter pillar upper member 162 and the quarter pillar lower member 164 may be connected to a rearmost cross member 240 of the cross unit.

By virtue of this structure, the lateral unit may have a hexagonal shape and parts corresponding to vertexes of the hexagonal shape may be connected to each other through the cross member, and thus the vehicle body may have an overall polygonal pillar shape. In addition, parts of the load path that are entirely connected to each other may be formed, and thus even when a collision occurs in any direction, shock may be effectively dispersed to the whole vehicle body and torsional rigidity may be enhanced. The cross member of the cross unit may have one end having a polygonal section and may be connected to the lateral unit 100 through the polygonal section. Through this connection structure, a section coefficient for transferring shock may be increased to effectively transfer shock from a member to another member and to effectively support the members.

As shown in FIG. 2, the lateral unit 100 may include a polygonal reinforced frame 400, an inner frame 500 coupled to a side of the reinforced frame 400, which corresponds to an internal side of the vehicle, and an outer frame 300 coupled to a side of the reinforced frame 400, which corresponds to an external side of the vehicle. The inner frame 500 may be coupled to parts 510 and 520, which correspond to a roof side and a quarter pillar of the reinforced frame 400, to form a structure with a closed section with the reinforced frame 400. The outer frame 300 may extend along an entire layout of the reinforced frame 400 and may be coupled to the reinforced frame 400 to form a structure with a closed section with the reinforced frame 400.

Accordingly, members of the lateral unit, which correspond to the front pillar upper side, the roof side, and the quarter pillar with which the inner frame 500, the reinforced frame 400, and the outer frame 300 overlap together may form a structure with a double closed section. The structure with a double closed section may be connected to the cross member to further improve a rigid structure.

FIG. 3 shows a load path of a vehicle body according to the present disclosure. As shown, even when shock is input from a front side, shock may be transferred and dispersed to a rear side from a front side through a ring-shaped lateral unit. Due to presence of a ring-shaped connection structure, the vehicle body may have enhanced endurance characteristics rather than being dented during front collision. In addition, bent parts may be re-connected through the cross member to enhance rigidity.

Accordingly, the vehicle body according to the present disclosure may also be applied to subcompact micro mobility or the like to ensure the torsional rigidity and collision rigidity of a vehicle. The vehicle body according to the present disclosure may also be applied to subcompact micro mobility or the like to ensure the torsional rigidity and collision rigidity of a vehicle.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A vehicle body, comprising:
   a lateral unit formed by connecting a front pillar member, a roof side member, a quarter pillar member, and a doorsill member, configures a structure of a lateral surface of the vehicle body, and simultaneously forms a door opening; and
   a cross unit having a plurality of cross members that extend in a width direction of a vehicle, connects the lateral units disposed at opposite sides in the width direction of the vehicle, and is used for connection of each of a foremost end, a rearmost end, an uppermost end, and a lowermost end of the lateral unit, wherein neighboring cross members form a closed loop-shaped structure together with members of the lateral units disposed at opposite sides, and the vehicle body entirely surrounds the loop-shaped structure, and wherein a connection point between the front pillar member and the doorsill member is connected to a front cross member of a lowermost end of the cross unit.

2. The vehicle body of claim 1, wherein the lateral unit has at least six vertex parts.

3. The vehicle body of claim 2, wherein the cross unit connects the vertex parts of the of the lateral units to each other.

4. The vehicle body of claim 1, wherein the front pillar member includes a front upper member and a front lower member, a connection point between the front upper member and the front lower member configures a foremost end portion of the lateral unit, and the foremost end portion of the lateral unit is connected to a foremost cross member of the cross unit.

5. The vehicle body of claim 4, wherein a lower end of a front wind shield glass is installed on a foremost cross member, and the foremost cross member is disposed in front of a front wheel suspension mounting portion of the vehicle.

6. The vehicle body of claim 1, wherein a central portion of the doorsill member is connected to a center cross member of a lowermost end of the cross unit.

7. The vehicle body of claim 1, wherein a connection point between the front pillar member and the roof side member is connected to a front cross member of an uppermost end of the cross unit.

8. The vehicle body of claim 1, wherein a connection point between the roof side member and the quarter pillar member is connected to a rear cross member of an uppermost end of the cross unit.

9. The vehicle body of claim 1, wherein the quarter pillar member includes:

a quarter pillar upper member that extends to be inclined backward and downward from an upper end of the quarter pillar member; and a quarter pillar lower member that extends forward and downward from a lower end of the quarter pillar upper member, wherein an upper end of the quarter pillar upper member is connected to the roof side member and a lower end of the quarter pillar lower member is connected to the doorsill member.

10. The vehicle body of claim 1, wherein a connection point between a quarter pillar upper member and a quarter pillar lower member is connected to a rearmost cross member of the cross unit.

11. The vehicle body of claim 1, wherein the cross member of the cross unit has an end with a polygonal section and is connected to the lateral unit through the polygonal section.

12. The vehicle body of claim 1, wherein the lateral unit includes a polygonal reinforced frame, an inner frame coupled to a side of the reinforced frame, which corresponds to an internal side of the vehicle, and an outer frame coupled to a side of the reinforced frame, which corresponds to an external side of the vehicle.

13. The vehicle body of claim 12, wherein the inner frame is coupled to parts that correspond to a roof side and a quarter pillar of the reinforced frame to form a structure of a closed section with the reinforced frame.

14. The vehicle body of claim 13, wherein the outer frame extends along an entire layout of the reinforced frame and is coupled to the reinforced frame to form a structure of a closed section with the reinforced frame, and members of the lateral unit, which correspond to the roof side, and the quarter pillar with which the inner frame, the reinforced frame, and the outer frame overlap together form a structure of a double closed section.

* * * * *